United States Patent [19]
Smith, III et al.

[11] 4,409,295
[45] Oct. 11, 1983

[54] ELECTRICAL CONNECTOR MATERIAL

[75] Inventors: Edward F. Smith, III, Madison; F. Dennis Gyurina, West Haven, both of Conn.

[73] Assignee: Olin Corporation, New Haven, Conn.

[21] Appl. No.: 341,354

[22] Filed: Jan. 21, 1982

[51] Int. Cl.[3] .......... B32F 15/04; H01H 1/02
[52] U.S. Cl. .......... 428/591; 428/671; 339/278 C; 200/262; 200/263; 200/265; 200/266; 200/267; 200/268
[58] Field of Search .......... 428/591, 671; 200/262, 200/263, 265, 266, 267, 268; 339/278 C

[56] References Cited

U.S. PATENT DOCUMENTS

| | | | |
|---|---|---|---|
| 2,300,286 | 10/1942 | Gwyn | 200/266 |
| 3,245,764 | 4/1966 | La Plante | 428/663 |
| 3,484,209 | 12/1969 | Antler et al. | 428/639 |
| 3,711,383 | 1/1973 | Schiekel et al. | 428/672 |
| 4,138,604 | 2/1979 | Harmsen et al. | 200/267 |
| 4,246,321 | 1/1981 | Shibata | 428/614 |

OTHER PUBLICATIONS

E. J. Caule and D. Gyurina, "Studies Toward Replacement of Noble Metal Contacts by Copper Alloys", Proc. 9th Int. Conf. on Elec. Contact Phenomena, Chicago 1978, pp. 173–179.
D. Gyurina and E. F. Smith, III, "A Lab. Study of Elec. Prop. of Copper Alloys in Elec. Contact Applications", Proc. of 26th Annual Holm Conf. on Electric. Contacts, Chicago 1980, pp. 85–93.

*Primary Examiner*—Veronica O'Keefe
*Attorney, Agent, or Firm*—Howard M. Cohn; Barry L. Kelmachter; Paul Weinstein

[57] ABSTRACT

An electrical connector arrangement comprises a first element adapted to be in contact for substantial periods of time with a second element. The first element comprises a first metal substrate having an outer layer of a copper base alloy comprising from about 2 to about 12% aluminum, about 0.001 to about 3% silicon, and the balance essentially copper. The second element comprises a second metal substrate having a gold or gold base alloy contact surface.

10 Claims, 15 Drawing Figures

ELECTRICAL CONNECTOR MATERIAL

The present invention relates to a process and apparatus for selecting metals for use in static electrical contact applications that have the ability to maintain low, stable electrical resistance and more particularly are not subject to degradation of the contact due to fretting.

The present invention primarily relates to electrical plug-type connectors having a "static" contact surface. This type of connector is frequently used with circuit boards associated with electronics and data processing equipment where the contact resistance of the electrical plug-type connectors must simultaneously be as low as possible and relatively constant through its useful life.

The selection of metals for use in static electrical contact applications involves consideration of properties such as wear resistance, formability, yield strength, and corrosion resistance. However, the most important performance requirement is probably the ability to maintain low, stable electrical resistance for the duration of the service life of the contact.

Generally, "static" terminal connector and contact systems are considered as being systems in which there is no relative movement between the two contacting surfaces. Often, this is not true since differences in coefficients of thermal expansion, not only of the connector material but of the material in which the connectors are housed or to which they are fastened, or vibration of the components can result in continuing movement and static connector and contact systems are, in reality, rubbing contact systems; and the difference between a "static" contact and a "rubbing" contact is only in the scale and amplitude of the relative movement.

Typically, because of continuous rubbing action, fretting, between two contacting base metal surfaces results in the buildup of quantities of fretting debris in the area of the contact. Typically, the debris includes oxides and other products formed as the result of the reaction of the contact material with its environment. Ultimately, the buildup of debris proceeds to the point at which it interferes with the function of the contact, the contact resistance sharply increases and the performance of the system becomes variable, unpredictable, and unsatisfactory.

Metals which have especially good electrical conductivity such as copper, silver, aluminum, often cannot be used for static low voltage contact applications. For example, copper and aluminum are often not suitable because their surfaces readily form oxide films or are subject to other reactive layers. As a result, the contact resistance of a "static" terminal changes by several orders of magnitude, unless specifically designed to prevent contact with the external environment, i.e. gas tight seals, vacuum or inert gas encapsulation.

Therefore, when contact resistance is important, gold is widely used as a contact surface material. In particular, where high reliability is required and voltages are low, an increase in the contact resistance of a base metal contact system has great impact upon the system performance.

Gold can be used for decreasing contact resistance in plug-type connectors practically without limitation, but its price is extremely high. Because of the formation of surface layers on practically all metals, except gold, gilded contact layers are used for electrical terminals in large quantity by applying a gold skin or thin coating directly or indirectly to a substrate which forms the body of the terminal.

A study entitled "Studies Toward the Replacement of Noble Metal Contacts by Copper Alloys" by Caule, E. J., Gyurina, D., *Proceedings of the Ninth International Conference on Electric Contact Phenomena, Chicago,* 1978, pp. 173–179, is concerned with monitoring the resistance change across a contact pair under conditions of relative motion. As seen in FIG. 2, the open circuit voltage of 50 volts was used in series with a 500 ohm dropping resistor. This produced a test current of approximately 100 milliamps. The present invention contrasts with that study since it is concerned with systems using open circuit voltages reduced by more than three orders of magnitude and working current reduced by approximately two orders of magnitude.

Another study entitled "A Laboratory Study of the Electrical Properties of Copper Alloys in Electric Contact Applications", by Gyurina, D. and Smith III, E. F., *Proceedings of the Twenty-Sixth Annual Holm Conference on Electrical Contacts,* Chicago, 1980, pp. 85–93 also discusses resistance changes across contact surfaces. As with the Caule et al. article, a much higher impressed and working current was used in the measurements as compared with the test conditions of the present invention, described hereinbelow.

U.S. Pat. No. 3,245,764 to La Plante discloses a gold alloy clad onto a metal substrate and generally relates to, for example, the "means and methods of cladding gold alloys of gold germanium, gold silicon and gold silicon germanium on substrates such as nickel, nickel iron, Kovar, molybdenum and related materials".

U.S. Pat. No. 3,484,209 to Antler et al. discloses, for example, that "galvanic corrosion of electroplate assemblies comprising a metal substrate coated with a porous plating of a more noble metal may be inhibited by providing within the pores an organic compound adapted to block off the galvanic action between the two metals".

U.S. Pat. No. 3,711,383 to Schiekel et al. and U.S. Pat. No. 4,138,604 to Harmsen et al. are of interest as they disclose contact surfaces which are coated with gold.

U.S. Pat. No. 4,246,321 to Shibata discloses, for example, a "composite electrical contact composed of a copper base portion clad with a contact portion of Ag-SnO alloy".

It is a problem underlying the present invention to provide an electrical contact which is able to maintain a relatively stable level of resistance.

It is an advantage of the present invention to provide an electrical connector arrangement which obviates one or more of the limitations and disadvantages of the described prior arrangements.

It is a further advantage of the present invention to provide an electrical connector arrangement which inhibits the increase in electrical resistance resulting from mechanical fretting.

It is a still further advantage of the present invention to provide an electrical connector arrangement which significantly reduces the amount of pure gold required in an electrical contact where the electrical resistance must be maintained relatively constant.

It is a still further advantage of the present invention to provide an electrical connector arrangement and a process which provide a relatively inexpensive solution to a previously expensive to solve problem.

Accordingly, there has been provided an electrical connector arrangement comprising a first element adapted to be in contact for substantial periods of time with a second element. The first element comprises a first metal substrate having an outer layer of a copper base alloy comprising from about 2 to about 12% aluminum, about 0.001 to about 3% silicon, and the balance essentially copper. The second element comprises a second metal substrate having a gold or gold base alloy contact surface.

The invention and further developments of the invention are now elucidated by means of preferred embodiments shown in the drawings.

Figure 10:
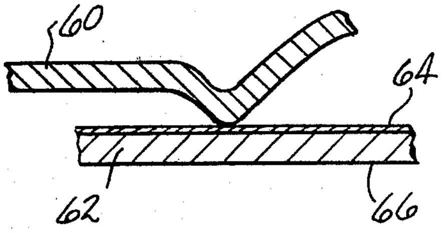
Figure 5A:
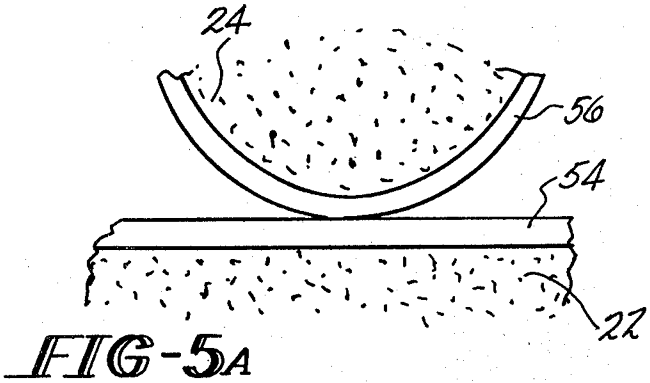
Figure 5B:
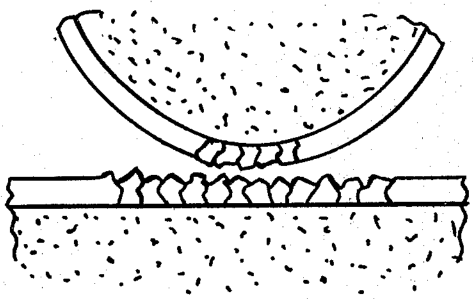
Figure 5C:
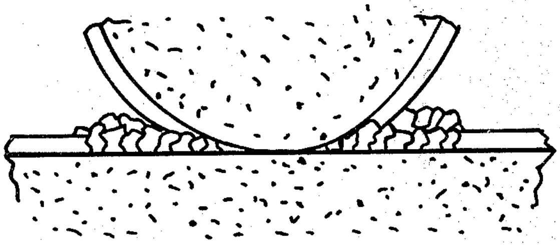
Figure 5D:
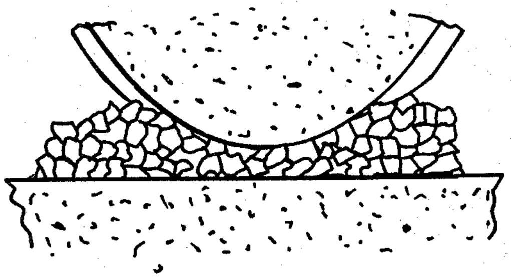
Figure 6:
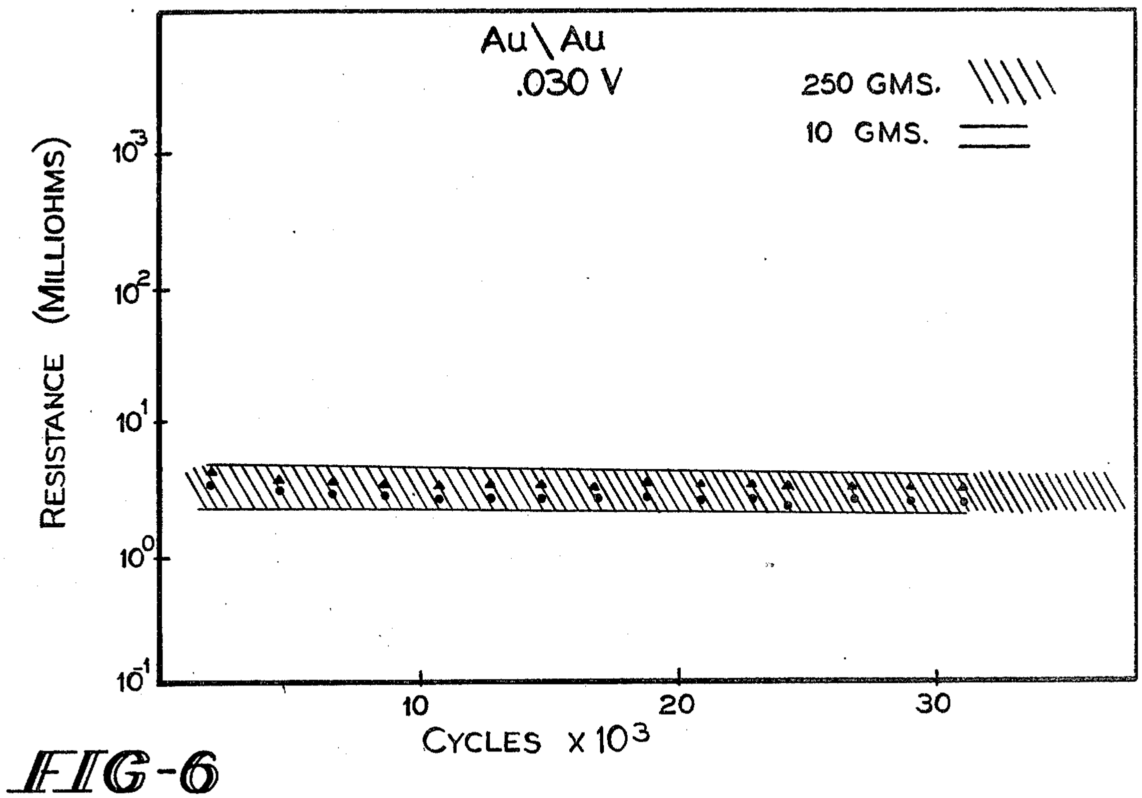
Figure 7:
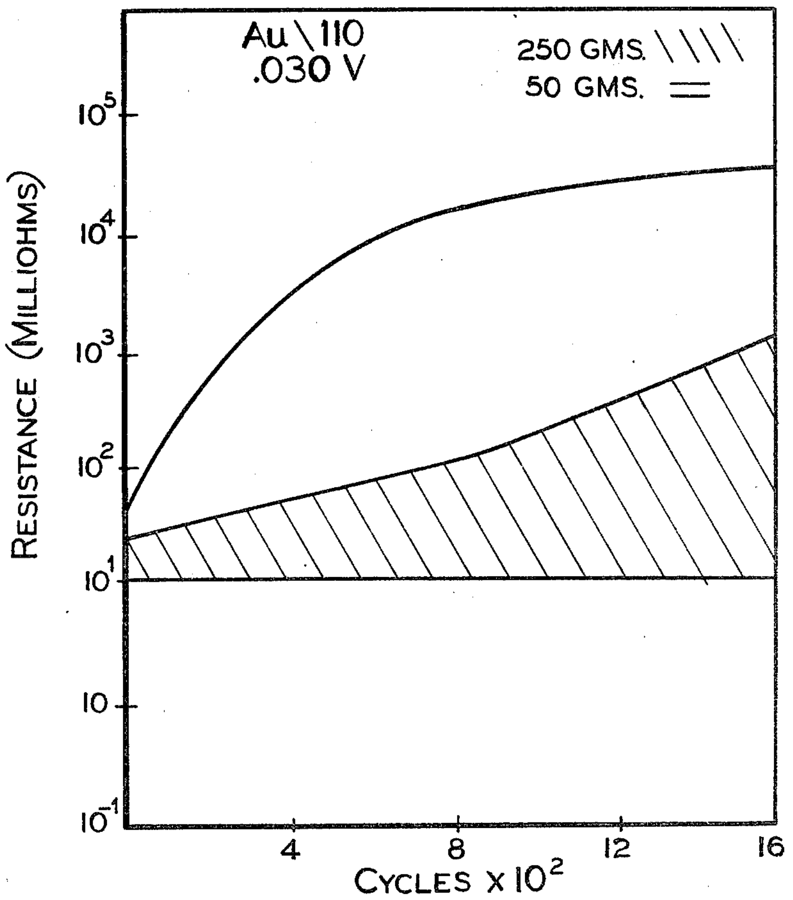
Figure 8:
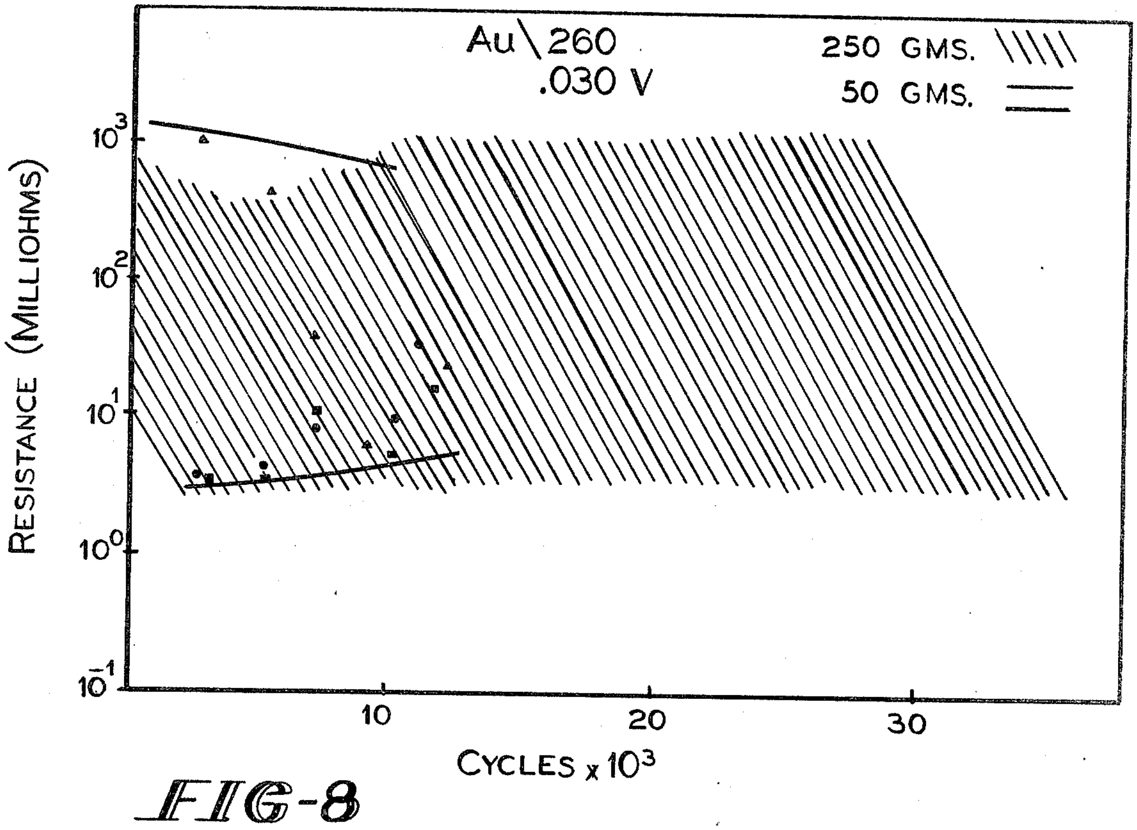
Figure 9:
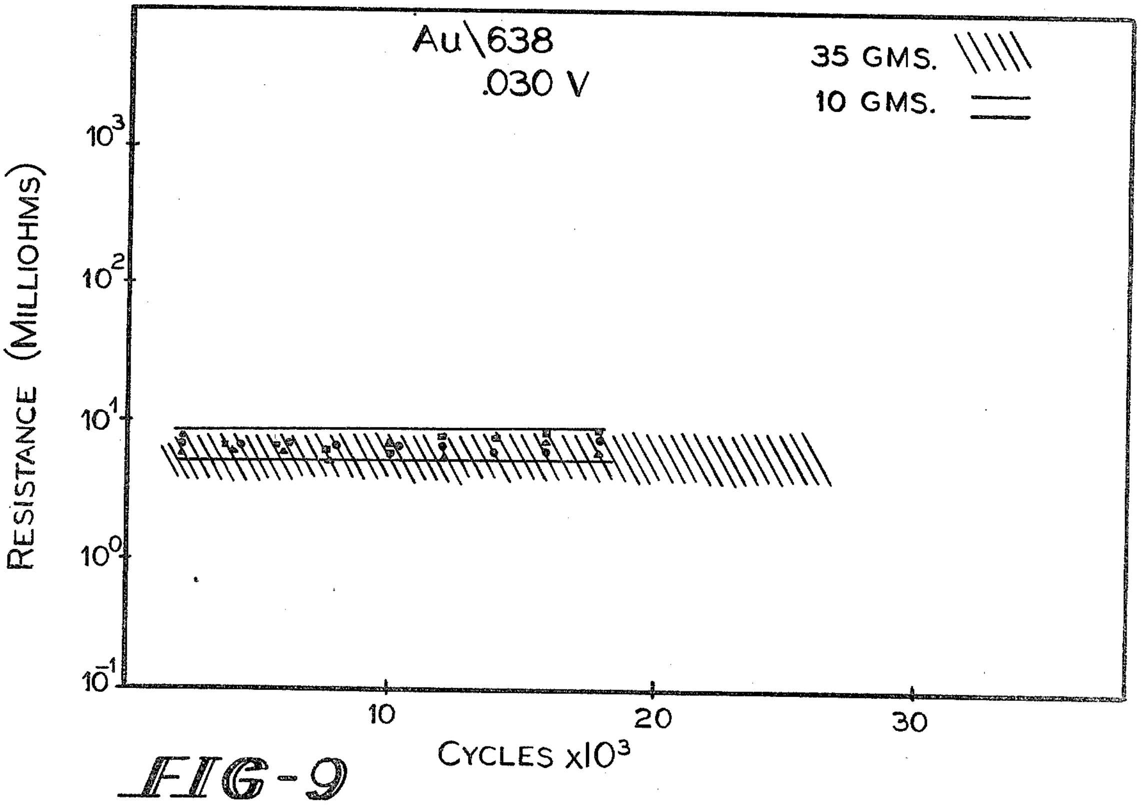
Figure 12:
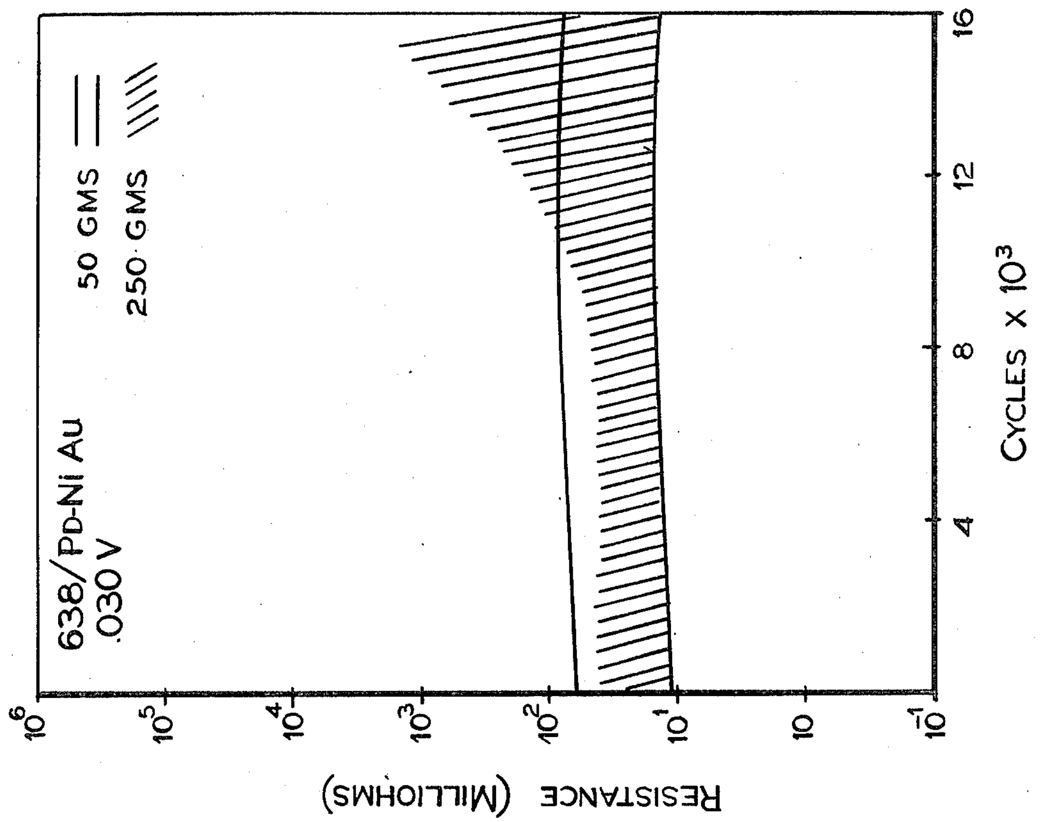
Figure 11:
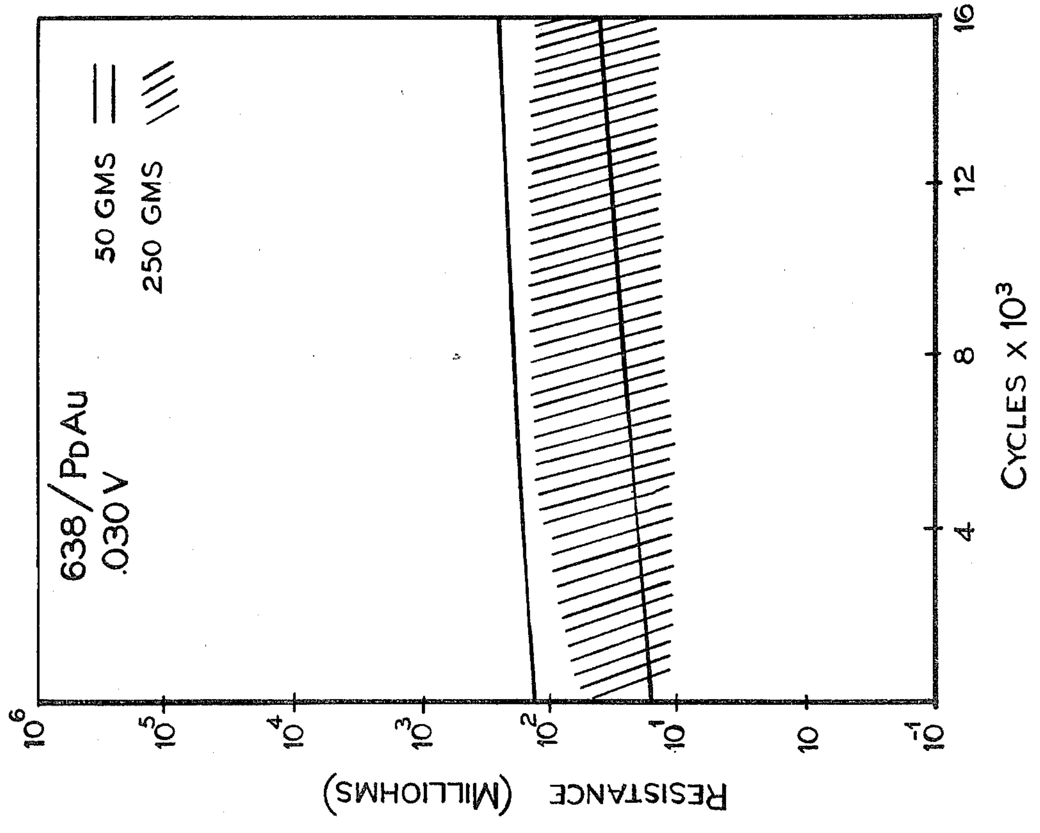

FIG. 5*a* is a cross section through a contact pair;

FIG. 5*b* shows the contact pair under a mechanical load;

FIG. 5*c* is a cross section of a contact pair having metal to metal contact;

FIG. 5*d* is a cross section of a contact pair with a fretting debris buildup;

FIG. 6 is a plot of a gold contact pair with an applied open circuit voltage of 0.03 volts;

FIG. 7 is a plot of the dissimilar contacts gold and alloy 110;

FIG. 8 is a plot of the contacts gold and alloy 260;

FIG. 9 is a plot of the electrical contacts gold and alloy 638 with an applied open circuit voltage of 0.03 volts;

FIG. 10 is an illustration of a typical contact pair;

FIG. 11 is a plot of the electrical contact pair of alloy 638 and gold flashed Pd surface; and FIG. 12 is a plot of an electrical contact pair consisting of alloy 638 and gold flash on a Pd-nickel surface.

The present invention is particularly related to electrical contact connectors that are in continual physical contact and are particularly prone to failure due to excessive fretting. An example of such an application is an edge board connector typically used in printed circuit applications. Under service conditions, variations in service temperatures can result in sufficient physical motion between the printed circuit board and the connector to cause fretting damage. Further, there may be applications wherein the PC board vibrates with respect to the connector to create relative motion between the contact members and excessive fretting. Fretting generally generates a resistive debris which is a combination of metal and metal oxides. Under fretting conditions, adhesive bonding between the two metal surfaces may occur. Then, as the metal surfaces continue their relative movement with respect to each other, the metal can actually be torn off from the surface at the point of adhesion. Since metals are generally reactive, the free metal may join with oxygen and the remaining surface also is in a state which has a tendency to bond with oxygen. The free metal and the free metal joined with oxygen or other constituents make up the electrically restrictive debris between the two metal surfaces.

Figure 1:
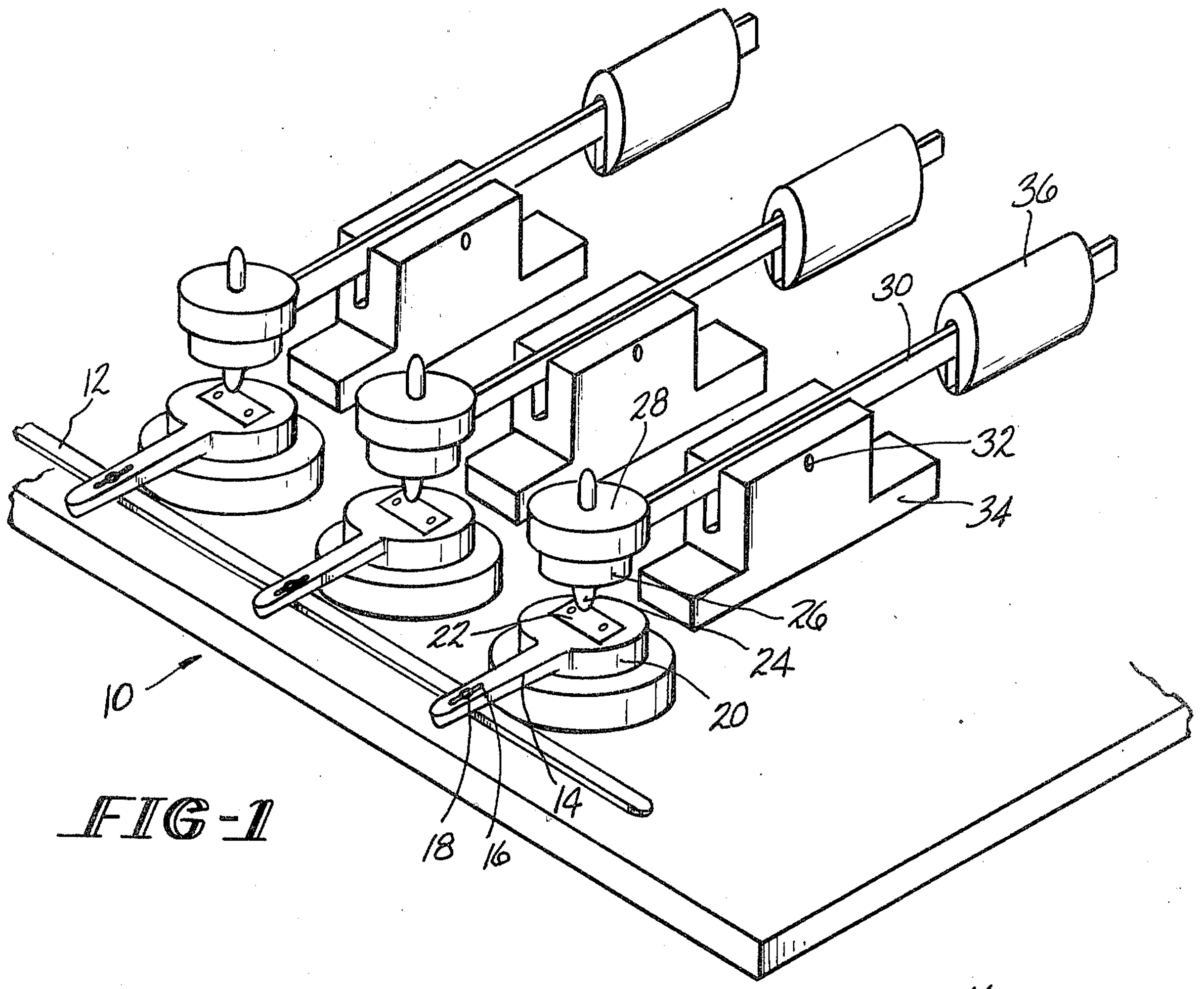
FIG. 1 is a pictorial view of a resistance test apparatus.

The data presented herein was obtained through the use of a testing procedure which incorporates relative movement of the contact members. The test apparatus, see FIGS. 1 and 2, generates relative motion at a variable amplitude between two contact members pressed together under a variable load. It also includes a voltage measuring system which was operative whether or not the test stations were in motion. The basic structure, as shown in FIG. 1, consists of a motor driven (not shown) horizontal shaft 12 which creates cyclical lateral motion, in any conventional manner. The horizontal shaft is attached to an arm 14. A slot 16, at one end of arm 14, receives a pin 18 that is affixed to the shaft 12. As the shaft 12 cycles laterally, the arm 14 oscillates through a desired angle ($\alpha$) which may be about 11°. The arm 14 is attached to a turntable 20 upon which surface contact material 22 is affixed. A probe tip 24, formed of a surface contact material, is mounted to a circular support member 26 in any desired fashion. A load 28 bears upon the support 26. A balance arm 30 is affixed to the support 26 and is attached by a pin 32 to an arm support 34, as shown in FIG. 1. Also, a counterweight 36 is provided at one end of the balance arm for adjusting the force which the probe 24 exerts against the test material 22. Although one of the test stations has been described herein, the other test stations shown in FIG. 1 operate in the same manner. Further, it is within the scope of the testing procedure to use any number of test stations as desired.

Figure 2:
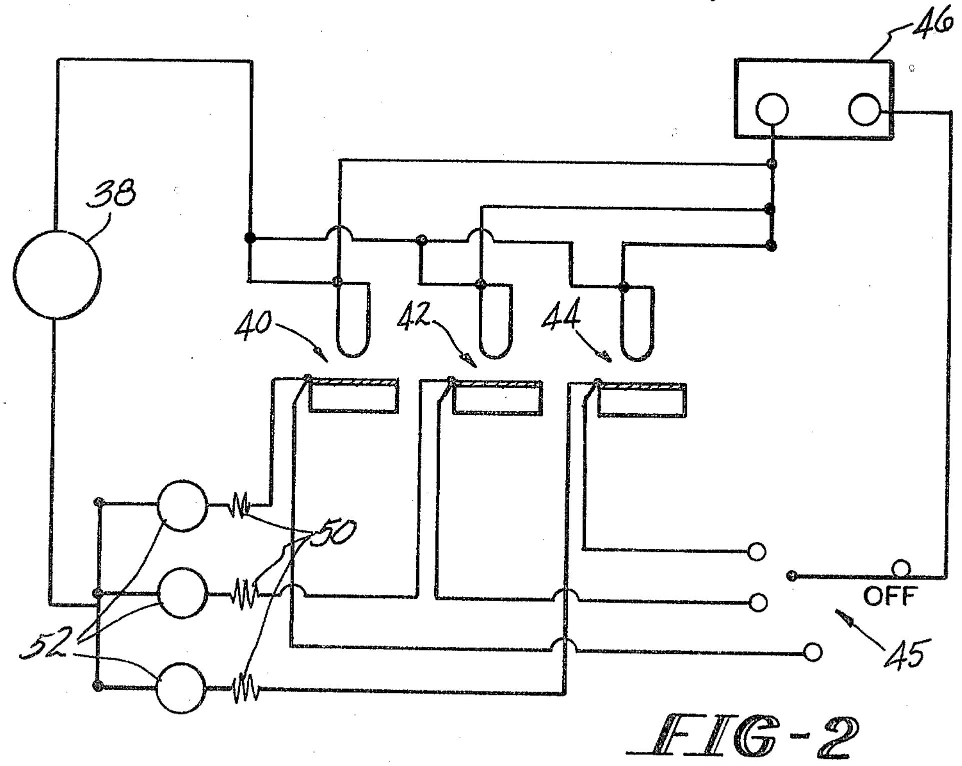
FIG. 2 is a schematic of the electrical measuring portion of the test apparatus.

A schematic of the electrical measurement portion of the apparatus is shown in FIG. 2. Three measurement stations are disclosed which correspond to the three testing stations illustrated in FIG. 1. A voltage generator 38 develops a desired voltage, such as for example 30 millivolts, across the samples at stations 40, 42, and 44. A millivolt recorder or potentiometer 46 can be connected through a rotary selector switch 48 to measure the voltage drop at any station. A resistor 50 is connected in series between each contact pair and the voltage generator and may be a value of 30 ohms for the measurements as provided below. Also, an amp meter 52 is connected in series with the resistors 50.

The tip of the probe 24 preferably has a hemispherical shape and is placed as close as possible to the center of rotation of the turntable 20. This placement acts to eliminate any wiping action between the probe and the specimen that creates additional variables which effect the analysis of fretting on the contact resistance. The fretting condition was simultated by rotating the specimen table at an amplitude of about 11° and at a period of 5.5 seconds (11 cycles per minute). Although a hemispherical probe on a flat surface is used in the analysis, it is within the scope of the present invention to use any other desired contact configuration.

To more fully understand the present invention and the data which was generated by the test apparatus described hereinabove, refer to FIG. 3 which was disclosed in the Gyurina and Smith paper mentioned above. A pair of alloy CDA 638 (about 2.80 aluminum, 1.8 silicon, 0.4 cobalt, and the balance copper) contacts were applied to each other for about 1,320 cycles (approximately 2 hours). The results, as represented by the bands, indicate low, stable resistance values at both 50 and 250 grams when 50 volts was applied across the contact and a 500 ohm resistor was serially connected between the voltage source and the contact whereby 100 milliamps was generated through the circuit. All of the data generated in the experiments are represented by bands in this application.

Figure 3:
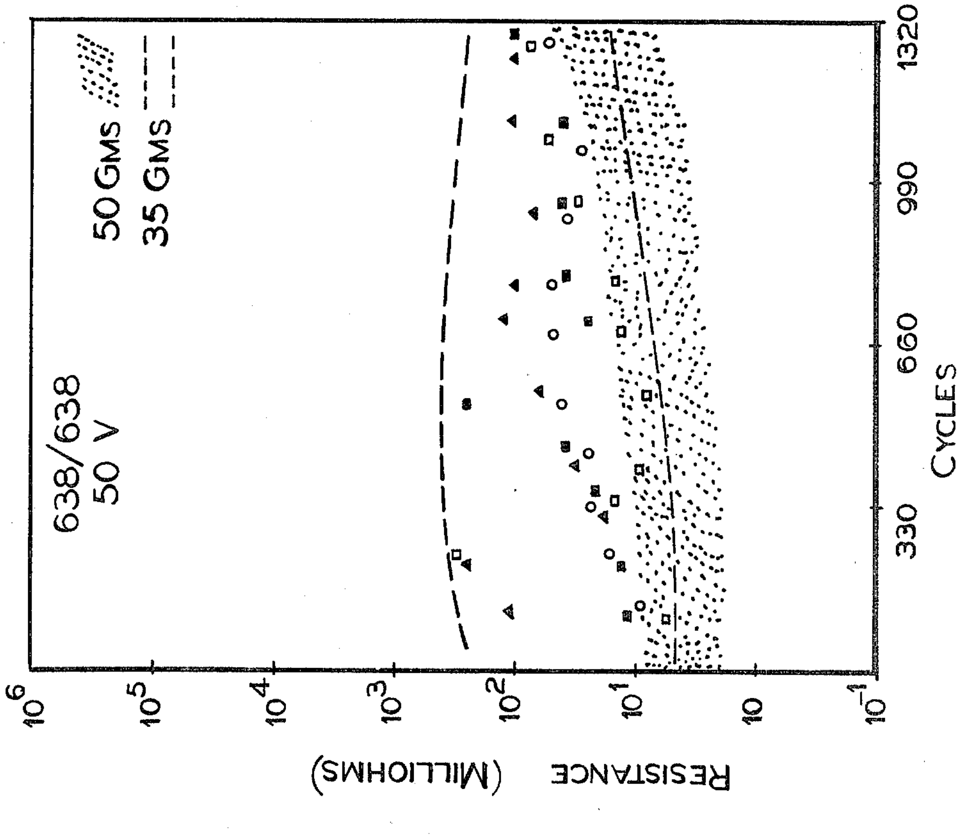
FIG. 3 is a plot of contact resistance vs. the number of test cycles indicating the contact pair response for alloy 638 at 50 volts open circuit.
Figure 4:
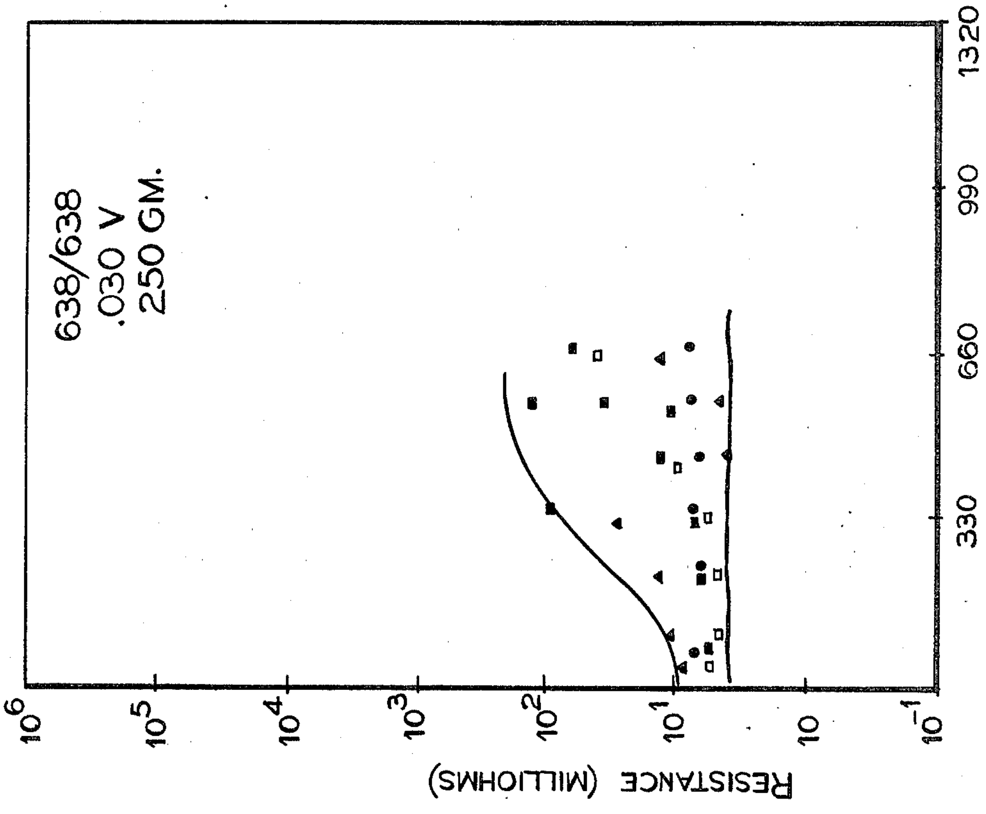
FIG. 4 is similar to FIG. 3 with the exception that the applied open circuit voltage across the contact is 0.03 volts.

In the operation of electronics and printed circuit boards where much lower voltages are used and which are of primary interest with regards to the present invention, a totally different result is reached as can be seen in FIG. 4. Using the same test apparatus provided for generating the data of FIG. 3, with the exception that 0.03 volts was applied across the contact of 638 to 638, a resistor of 30 ohms was placed in series between the contact and the voltage source and a current of 1 milliampere was generated through the test circuit. The results indicate that even with a load of 250 grams between the contact points, high unstable resistance values were found to be generated within the first one hour of operation.

The comparison of the data described by FIG. 3 and FIG. 4 can be better understood by referring to FIGS. 5*a*–5*d* which illustrate a section of the contact pair of the test apparatus. In FIG. 5*a*, an element 24, which may be from one part of the contact pair and be of any desired shape, such as hemispherical, is shown in contact with a second element 22 of the contact pair. The second element may be flat or any other shape as desired. Both of the contact elements, 22 and 24, have a surface film 54 and 56, respectively. The presence of a surface film prevents direct physical contact of the metal surfaces. This barrier tends to decrease the electrical continuity of the interface and prevents material transfer between the contact members. In this condition, the voltage required to direct a current across the interface of the contact points is a function of the thickness and electrical properties of the oxide. Then, a mechanical load is applied and the oxide begins to thin out or break down, as shown in FIG. 5*b*. This mechanical load may represent the spring force inherent in the material forming a static electrical contact. The amount of load may change the inherent resistance due to the oxide film. If the mechanical load is high enough, the film may rupture and direct metal to metal contact may be achieved as shown in FIG. 5*c*. At this time, a lower resistance across the contact point exists as compared to when the film is present as in FIG. 5*a* or 5*b*. This lower resistance is caused by the inherent resistance of the metal and the geometric size of the contact area. In actual practice, the systems under discussion do not generally have metal to metal contact because at least an air formed surface film is generally present on the surface of the metal. As the metal contacts move against each other due to vibration, differential thermal expansion, or for any other reason, and as simulted by the resistance test apparatus as shown in FIG. 1, a large scale accumulation of fretting debris in the contact area develops. This debris buildup may ultimately lead to a contact breakdown due to the increase of resistance.

With this model in mind, an understanding of the phenomena which occurred using the test equipment with the contact pair of alloy 638 at different impressed voltages, see FIGS. 3 and 4, can be more fully understood. In FIG. 3, which used a relatively small load of between 35 and 50 grams, but an impressed voltage of 50 volts and a series resistor of 500 ohms, the dotted scatter band at the higher load indicates a more constant resistance while the greater degree of scatter of the lower load indicated a less stable resistance. Accordingly, in analyzing the model in FIGS. 5*a*–5*d*, a decrease in the thickness of the oxide film might lead to the conclusion that resistance would tend to maintain itself at a relatively low level. However, referring to FIG. 4 where a load of 250 grams was applied to the same type of contact but with an applied 0.03 volts and a 30 ohm resistor, the contact was found to produce high, unstable resistance values in a very short period of time. It is believed that since the voltage was relatively high in FIG. 3, the current was still able to conduct through the residual surface film at the contact point. However, in FIG. 4 since the impressed voltage was so much lower, it was not able to drive the current through the fretting related films and, therefore, the resistance at the contact increased very rapidly.

Referring to FIG. 6, there is illustrated the data generated with a gold to gold contact that was run for 137,000 cycles at 0.03 volts. The data indicates very low stable resistance values which were essentially the same irrespective of the load. This data is expected because gold does not generally tarnish and, therefore, the resistance at the contact point is primarily due to the inherent resistance of the metal and the contact surface area. The ability to maintain a contact resistance at essentially the same low value for such a long period of time is an exceedingly useful condition that has exceptional operational benefits. Unfortunately, as mentioned above, gold is very expensive and, therefore, it would be of great economic benefit to find an alternative to a pair of gold contact elements.

A number of alloys were tested by the fretting contact resistance apparatus where one of the contact surfaces was gold and the other surface was the tested alloy. An example is shown in FIG. 7 which shows alloy CDA 110 (99.9% copper) against gold. It can be seen that for low loads, the scatter bands quickly deteriorate resulting in a relatively fast breakdown of the contact.

Another example of a contact pair which breaks down quickly under low voltage is gold vs. copper alloy CDA 260 (30% zinc and the balance copper). As can be seen in FIG. 8, the scatter band for either the high or low load is extremely wide from the very onset of the experiment. This seems to indicate that a copper alloy which includes zinc may have some inherent characteristic that would prevent it from being a suitable low voltage contact point.

During the experimentation with different materials, a copper alloy designated as CDA 638 emerged as having contact performance which is very similar to a gold vs. gold contact. Referring to FIG. 9, the scatter band for both loads indicates that the contact produced low, stable resistance values for a large number of cycles. Alloy 638 is a copper base alloy comprising about 2 to about 12% aluminum, about 0.001 to about 3% silicon, and the balance essentially copper. In particular, CDA 638 containing 2.5 to 3.1% aluminum, 1.5 to 2.1% silicon, and 0.25 to 0.55% cobalt is most useful in providing the electrical contact surface in accordance with this invention. Impurities may be present which do not significantly alter the electrical qualities of the contact. If desired, the copper base alloy may further comprise a grain refining element selected from the group consisting of iron up to 4.5%, chromium up to 1%, zirconium up to 0.5%, cobalt up to 1% and mixtures thereof.

Referring to FIG. 10, there is illustrated an example of a static electrical contact connector of the type to which the present invention is directed. The contact pair may be formed of two elements 60 and 62. Element 60 is preferably formed of a solid strip of CDA 638 which is in contact for substantial periods of time with a second element 62 having a gold or gold base alloy contact surface 64. The surface of element 60 may be pressed against the surface of element 62 by any conventional means such as a spring bias in the element or an external force applied to the element 60. Although a curved configuration of element 60 is illustrated, it is within the scope of the present invention to use any desired configuration. Further, the elements may be interchanged with the gold surface on element 60 and the 638 surface on the element 62. Also, the strip 60 may have a layer of 638 applied to a substrate of any desired metal. However, the present invention, as illustrated in FIG. 10, provides element 60 as a solid strip of 638.

It is thought that an important difference between an electrical contact pair formed of a gold contact surface and 638 as compared with other alloys which were tested is the resistance to the building up of fretting debris. With the 638 and gold contact surface, even over a large number of cycles, the resulting fretting debris does not significantly affect the contact performance as can be verified by the data provided in FIG. 9.

The second element 62 of the contact pair, as illustrated in FIG. 10, may comprise a metal substrate 66 having a gold or gold base alloy contact surface 64. The metal substrate 66 may be of any suitable carrier materials such as for example brass, bronze, copper. A thin layer of gold is applied to the surface of the metal substrate in any conventional manner. The contact surface 64 may actually be gold or a gold base alloy such as for example cobalt gold. Due to the diffusion of the substrate into the gold, it is also often desirable to place an intermediate diffusion barrier layer (not shown) comprising some metal or alloy between the substrate and the gold surface. This metal or alloy may be selected from a group consisting of materials such as Pd, Fe, Ti, V, Cb, Ta, Mo, Sn, Pb, Ni, and W and alloys thereof and any other material which may be effective as a barrier layer. Further, since gold is a relatively soft material, it is also within the scope of the present invention to use a gold alloy such as gold cobalt to plate over either the diffusion barrier layer or the substrate.

During the testing procedure, an electrical contact pair comprising alloy 638 and a thin gold contact surface over a palladium coated substrate was considered and the results are shown in FIG. 11. It can be seen that the resistance of the contact varies approximately one magnitude and, therefore, may be considered as a possible alternative where cost constraints would favor a reduction in the thickness of the gold layer.

Also, a contact pair comprising 638 and a gold contact surface plated over a substrate with a palladium nickel diffusion barrier is illustrated in FIG. 12. Apparently, the relatively constant resistance with the lower 50 gram loading is due to the reduced wear through the thin surface gold layer.

The patents and papers set forth in this application are intended to be incorporated by reference herein.

It is apparent that there has been provided in accordance with this invention an electrical connector arrangement and a method of forming the arrangement which fully satisfies the objects, means, and advantages set forth hereinabove. While the invention has been described in combination with the specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A static electrical connector arrangement, comprising:

a first element having a first contact surface thereon, said first element comprising a first metal substrate having a copper base alloy comprising from about 2 to about 12% aluminum, about 0.001 to about 3% silicon, and the balance essentially copper;

a second element having a second contact surface thereon, said second contact surface being a gold or gold base alloy; and means for pressing said first contact surface against said second contact surface whereby substantial elimination of fretting debris buildup between the contact surfaces is achieved.

2. An electrical connector arrangement as in claim 1 wherein said copper base alloy consists essentially of 2.5 to 3.1% aluminum, 1.5 to 2.1% silicon, 0.25 to 0.55% cobalt, and the balance essentially copper.

3. An electrical connector arrangement as in claim 1 wherein said first metal substrate further comprises said copper base alloy throughout.

4. An electrical connector arrangement as in claim 1 wherein said second element further includes a layer of palladium between said second metal substrate and said gold or gold base alloy contact surface.

5. A static electrical connector arrangement, comprising:

a first element having a first contact surface thereon, said element comprising a first metal substrate having a copper base alloy consisting essentially of 2.5 to 3.1% aluminum, 1.5 to 2.5% silicon, 0.25 to 0.55% cobalt, a grain refining element selected from the group consisting of iron up to 4.5%, chromium up to 1%, zirconium up to 0.5%, cobalt up to 1% and mixtures thereof, and the balance essentially copper;

a second element having a second contact surface thereon, said second contact surface having a gold or gold base alloy; and means for pressing said first contact surface against said second contact surface whereby substantial elimination of fretting debris buildup between the contact surfaces is achieved.

6. The process of constructing a static electrical connector, comprising the steps of:

forming a first contact surface on a first metal substrate from a copper base alloy comprising from about 2 to about 12% aluminum, about 0.001 to about 3% silicon, and the balance essentially copper;

forming a second contact surface from a gold or gold base alloy coating on a second metal substrate; and pressing said first contact surface against said second contact surface whereby substantial elimination of fretting debris buildup between the contact surfaces is achieved.

7. The process as in claim 6 wherein said copper base alloy consists essentially of 2.5 to 3.1% aluminum, 1.5 to 2.1% silicon, 0.25 to 0.55% cobalt, and the balance essentially copper.

8. The process of constructing a static electrical connector, comprising the steps of:

forming a first contact surface on a first metal substrate from a copper base alloy consisting essentially of 2.5 to 3.1% aluminum, 1.5 to 2.1% silicon, 0.25 to 0.55% cobalt, a grain refining element selected from the group consisting of iron up to 4.5%, chromium up to 1%, zirconium up to 0.5%, cobalt up to 1% and mixtures thereof, and the balance essentially copper;

forming a second contact surface from a gold or gold base alloy coating on a second metal substrate; and pressing said first contact surface against said second contact surface whereby substantial elimination of fretting debris buildup between the contact surfaces is achieved.

9. The process as in claim 6 wherein said copper base alloy forms substantially said entire second metal substrate.

10. The process as in claim 6 further including the step of applying a layer of palladium between said second metal substrate and said gold or gold base alloy contact surface.

* * * * *